(12) United States Patent
Zege et al.

(10) Patent No.: US 7,247,234 B1
(45) Date of Patent: Jul. 24, 2007

(54) METHOD FOR COMBINED PROCESSING OF DIESEL FUEL

(76) Inventors: Oleg N. Zege, ul. Planetnayad 47, kv 43, Moscow 125319 (RU); Jury N. Zharchenkov, ul. Pushkina d 2, kv 88, Zheleznodorozhny, Mosc.obl., 143980 (RU); Tamara N. Mitusova, ul. Storozhevaya d. 20, kv 135, Moscow 111020 (RU); Alexandr I. Mishin, P/O 80-76, Lubertsy 3, Mosc. Obl., 140003 (RU); Andrei S. Popov, Sr. Kislovsky per. d 7/10, kv. 26, Moscow 103009 (RU); Alexandr V. Tsivulin, ul. Planetnaya d. 47, kv. 20, Moscow 125319 (RU)

( * ) Notice: Subject to any disclaimer, the term of this patent is extended or adjusted under 35 U.S.C. 154(b) by 579 days.

(21) Appl. No.: 10/089,979

(22) PCT Filed: Jun. 20, 2000

(86) PCT No.: PCT/RU00/00238

§ 371 (c)(1), (2), (4) Date: Sep. 30, 2002

(87) PCT Pub. No.: WO01/11218

PCT Pub. Date: Feb. 15, 2001

(30) Foreign Application Priority Data

Aug. 5, 1999 (RU) .................................. 99117061

(51) Int. Cl.
*C10G 31/00* (2006.01)
*C10G 17/00* (2006.01)

(52) U.S. Cl. .................. 208/177; 208/88; 208/189; 44/305; 123/1 A; 196/14.5; 210/762; 210/777; 585/446; 585/448

(58) Field of Classification Search ............... 44/305; 123/1 A; 196/14.5; 208/88, 189, 177; 210/762, 210/777; 585/446, 448
See application file for complete search history.

(56) References Cited

U.S. PATENT DOCUMENTS 3,014,793 A * 12/1961 Weisgerber et al. .......... 44/305

(Continued)

FOREIGN PATENT DOCUMENTS

DE 3442980 A1 * 5/1986

*Primary Examiner*—Glenn Caldarola
*Assistant Examiner*—Prem C. Singh
(74) *Attorney, Agent, or Firm*—I. Zborovsky

(57) ABSTRACT

The essence of the method is that diesel fuel is heated in the process of periodical circulation in a closed circuit including a heat exchanger and a rotor-disc apparatus of open type in centrifugal force field of which processes of mechanical destruction and dispersion run in environment of sucked air with oxygen saturation, simultaneously with processes of separation and homogenization fine filtration is carried out at a filtering porous partition of hydrophobic material with purification fineness 3÷8 micron as well as filtration at a multilayer filter-reactor at temperature 25÷45° C. which comprises granules of multifunctional catalyst alkylating aromatic compounds and a layer of fill of powder of transitional metals or their oxides. Then the treated fuel is stabilized by adding additives on the basis of surface-active substances. At that conical trays of the rotor-disc apparatus of open type are made with destruction edge in form of flanging with slots and bends at the following correlation of geometric parameters:

Figure 1:
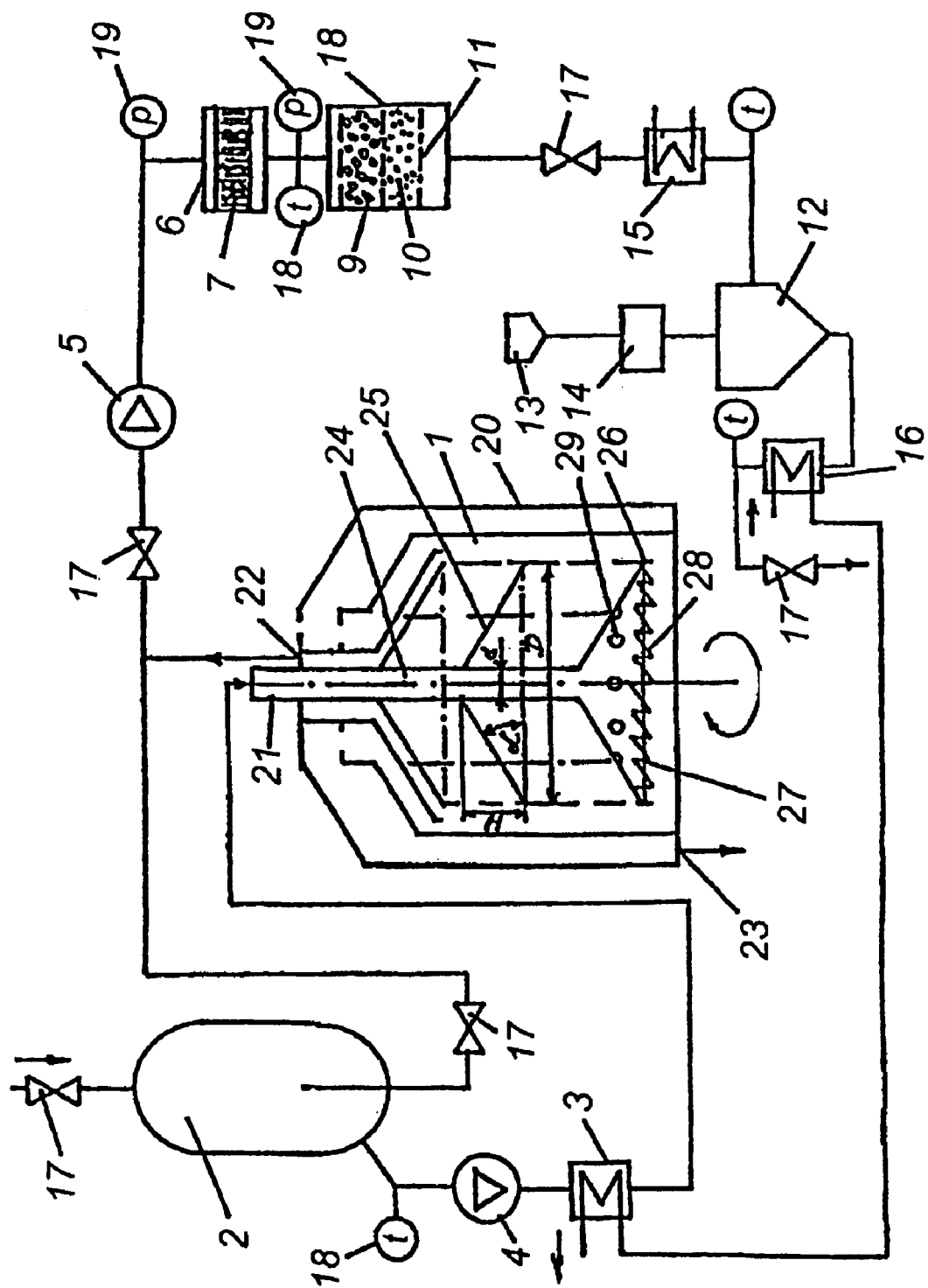

$D = (2.0 \div 2.5)d;$ $H = (0.75 \div 0.85)d;$ $\alpha = 45 \div 55°$ where:
  D = diameter of the large (lower) base of the conical tray;
  d = diameter of the small (upper) base of the conical tray;
  H = height of the conical tray;
  α = angle between the generator and the large (lower) base of the conical tray.

2 Claims, 1 Drawing Sheet

U.S. PATENT DOCUMENTS 3,053,756 A * 9/1962 Cordes et al. .............. 208/189
5,681,483 A * 10/1997 Navaree et al. ............. 210/777
5,866,738 A * 2/1999 Bencini et al. ............. 585/448
5,942,127 A * 8/1999 Wilcox et al. .............. 210/762

* cited by examiner

METHOD FOR COMBINED PROCESSING OF DIESEL FUEL

FIELD OF INVENTION

The present invention relates to the field of mechanical engineering, in particular to engine manufacturing and can be used for preparation of diesel fuel with improved properties.

PRIOR ART

From the prior art the method of diesel fuel treatment is known when it is heated, homogenized and separated in centrifugal force field at fuel movement from the bottom up in the vortex apparatus of rotor-disc type and then is finely filtered at filtering porous partition of hydrophobic material (ref. RU 2105184 A, F02M 43/00, 1998)

To increase the level of stabilization of homogenized finely divided structure additives on the basis of ethylene with vinylacetate copolymer solution in hydrocarbon solvent are added to dehydrated and purified fuel, that improves the quality of fuel at storage. But waste gases, generated in the engine at burning of thus complex-treated diesel fuel, contain sufficient amount of toxic exhaust (including cancerogenic polyaromatic hydrocarbons, nitrogenous compounds, carbon black).

The vortex apparatus of rotor-disc type for complex treatment of diesel fuel comprising the case with inlet and outlet pipe connections is also known in inner cavity of which a rotor is installed with a set of conical trays having holes round the periphery zone (ref. RU 2054572 A, F02M 43/00, 1996). Simultaneous processes of separation and homogenization run in said vortex, apparatus, that provides creation of homogeneity and finely divided structure of diesel fuel being treated but at that destruction ability of the apparatus is not sufficiently high.

DISCLOSURE OF INVENTION

The object of this invention is to improve operation and ecology properties of diesel fuel and creation of a rotor-disc vortex apparatus of open type providing effective mechanical destruction of resinous-asphaltene compounds contained in diesel fuel.

The object is achieved by the method of complex treatment of diesel fuel including heating, homogenization and separation in centrifugal force field in a rotor-disc vortex apparatus and fine filtration at filtering porous partition of hydrophobic material which is carried out according to this invention with pre-heating of fuel in the coarse of periodic circulation in a closed circuit including a heat exchanger and a rotor-disc apparatus of open type, and additional filtration is carried out with a multilayer filter-reactor comprising granules of multifunctional catalyst, alkylating aromatic compounds, and a layer of fill of powder of transitional metals or their oxides.

At that additional filtration is carried out at temperature of fuel being treated of 25 to 45° C. and at pressure differential at filter-catalyst to 0.2 MPa, and active carbon impregnated with salts of Na, Ca, Mg, Mn metals or rare-earth metals or high-silica zeolite in hydrogenous form with addition of metal promoter of Cu Ba-ПВМ, NaY, Co Na Y, CaNaY type is used, and a layer of fill is made in form of a porous structure with rectification fineness of 0.5 to 1.5 micron of powder of metals Fe, Ni, Cu, Cr, Ag, V, W, Mo or their oxides.

It is preferred after fine filtration at the filtering porous partition of hydrophobic material with purification fineness of 3 to 8 micron and at the multilayer filter-reactor to heat fuel being treated and to add multifunctional (depressive, stabilizing etc) additives on the basis of surface-active substances with subsequent cooling of treated fuel before storage to environmental temperature.

It is desirable to use heat, extracted at cooling treated fuel, for heating diesel fuel before the rotor-disc vortex apparatus.

This object is achieved by the vortex apparatus of rotor-disc type for complex treatment of diesel fuel comprising case with inlet and outlet pipe connections, in inner cavity of which a rotor is installed with a set of conical trays having holes round the periphery zone and according to this invention the said inner cavity is connected with environment, the conical trays are made with destruction edge in form of flanging with slots and bends at the following correlation of geometric parameters:

$$D=(2,0 \div 2,5)d;$$

$$H=(0,75 \div 0,85)d;$$

$$\alpha=45 \div 55°$$

where:
D=diameter of the large (lower) base of the conical tray;
d=diameter of the small (upper) base of the conical tray;
H=height of the conical tray;
$\alpha$=angle between the forming and the large (lower) base of the conical tray.

Process of multifunctional catalysis at additional filtering diesel fuel being treated provides alkylating aromatic hydrocarbons by unsaturated compounds and this, combined with subsequent dehydrogenation, increases level of homogenization of diesel fuel in molecular weight and hydrocarbon structure providing, to the point, molecular mixing of diesel fuel with oxidant (oxygen). In addition preliminary mechanical destruction in the rotor-disc vortex apparatus with simultaneous separation and subsequent fine filtration at the filtering porous partition of hydrophobic material allows to remove resinous-asphaltene compounds from diesel fuel being treated, that improves quality of fuel and ecological state due to improvement of completeness burning thereof.

The drawing represents the scheme of a unit for complex treatment of diesel fuel.

BEST MODE FOR CARRYING OUT THE INVENTION

The unit comprises a rotor-disc vortex apparatus of open type 1 included in a circulation circuit jointly with a reservoir (tank) 2, a heat exchanger 3 and a circulation geared pump 4, a transfer pump 5, a filter 6 with a filtering porous partition 7 of hydrophobic polymer material such as polyvinylchloride fiber or polyvinylformal with purification fineness (average transversal pore size) 3÷8 micron, a multilayer filter-reactor 8, filled with granules of multifunctional catalyst 9 alkylating aromatic compounds and a layer 10 of fill of powder of transitional metals or their oxides forming a porous structure with purification fineness (average transversal pore size) 0.5÷1.5 micron which is located between copper grids 11 with cell size not exceeding the size of fill powder particles. After the multilayer filter-rector 8 a system of stabilization of diesel fuel being treated is connected comprising a mixer 12, a hopper 13 for additive with a metering device 14, a heat exchanger-heater 15 and a heat exchanger-cooler 16 the outlet of which is connected with the exchanger (3) inlet. The unit is equipped with locking-controlling apparatus 17 and checkout equipment 18 and 19.

A rotor-disc vortex apparatus of open type 1 comprises the a case 20 with an inlet pipe connection 21 for fuel being treated, an outlet pipe connection 22 for treated fuel and an outlet pipe connection 23 for drain of separated coarse-divided water-fuel emulsion, in inner cavity of which a rotor 24 is installed with a set of conical trays 25 made with the destruction edge 26 in form of flanging with slots (27) and bends (28) and holes (29) round the periphery zone at the following correlation of geometric parameters:

$$D=(2.0 \div 2.5)d;$$

$$H=(0.75 \div 0.85)d;$$

$$\alpha 45 \div 55°$$

where:
- D—diameter of the large (lower) base of the conical tray;
- d—diameter of the small (upper) base of the conical tray;
- H—height of the conical tray;
- α—angle between the forming and the large (lower) base of the conical tray.

As a variant of an optimum rotor-disc vortex apparatus the conical trays 25 have: d=100 mm; D=235 mm; H=80 mm at α=50°, which provides effective processes of mechanical destruction and dispersion of diesel fuel being treated simultaneously with the processes of separation and homogenization.

Granules of activated carbon impregnated with the salts of metals Na, Ca, Mg, Mn or rare-earth metals or high-silica zeolite in hydrogenous form with addition of metal promoter of Cu Ba—CVM (ПBM), NaY, Co Na Y, CaNaY type can be used as a multifunctional catalyst 9, alkylating aromatic compounds, for the multilayer filter-reactor 8, and the layer (10) of fill of a porous structure can be made of powder of transient metals Fe, Ni, Cr, Ag, V, W, Mo or their oxides.

The method of complex treatment of diesel fuel according to this invention is realized as follows.

Diesel fuel being treated including rehydrated one enters the reservoir (tank) 2 and initially is circulated in a closed circuit including a heat exchanger 3 and a rotor-disc vortex apparatus 1 of open type with a circulation geared pump 4. At that heated to temperature of ~35° C. diesel fuel is subject to intensive hydrodynamic and mechanical effect at movement from the bottom up in the centrifugal force field between conical trays 25 which provides processes of mechanical destruction of resinous-asphaltene compounds and dispersion in the environment of sucked air with oxygen saturation simultaneously with the processes of separation and homogenization accompanied by the drain of separated coarse divided water-fuel emulsion, containing destruction resinous products, through the outlet pipe connection 23. Prepared thus diesel fuel is supplied with a transfer pump 5 from the outlet pipe connection 22 of the vortex apparatus 1 to the filter 6 where the process of fine filtration, accompanied by separation of fine divided emulsion water and complex purification of fuel of associations of resinous substances including formed by oxidation b- and polycyclic aromatic hydrocarbons, runs at the filtering porous partition 7 of hydrophobic polymer material. At subsequent filtration of diesel fuel in the multilayer filter-reactor 8, in which pressure differential to 0.2 MPa is sustained at temperature 25÷45° C., alkylating of aromatic compounds of hydrocarbons takes place, and at fuel movement through the layer 10 of the fill of powder of transient metals or their oxides forming porous structure with purification fineness 0,5÷1.5 micron which retains hard particles—products of aromatic hydrocarbon transformation, adsorptive processes and catalytic homogeneous oxidation of aromatic hydrocarbons with aromatic ring (benzene nucleus) opening run causing formation of polyconjugated polymers and spatial structures which promotes improvement of quality composition of diesel fuel. Then treated fuel with improved structure is heated in the heat exchanger 15 and is supplied to the mixer 12 where complex (depressive, stabilizing) additive on the basis of surface-active substances such as solution of copolymer of ethylene with vinylacetate in hydrocarbon solvent or derivatives of olefin with low molecular weight of Keroflux type in amount of 0.005÷0.05 mass % is added from the hopper 13 through the metering device 14 stabilizing it, and cooling of obtained homogeneous fine divided structure is carried out to environmental temperature in the heat exchanger-cooler 16 before filling fuel tanks or transferring for long-duration storage.

It is useful to use heat extracted at cooling in the heat exchanger-cooler 16 to heat diesel fuel in the heat exchanger 3.

The table gives comparative indexes of starting and treated in accordance with this invention diesel fuel.

TABLE

| S/N | Index name | Index value for starting fuel* | Index value for treated fuel** |
|---|---|---|---|
| | Physical-chemical properties of fuel | | |
| 1.1 | Temperature of solidification (° C.) | −8 | −28 |
| 1.2 | Ultimate temperature of filterability at cold filter (° C.) | −4 | −18 |
| 1.3 | Coking capacity of 10% residual (%) | 0.02 | 0.018 |
| 1.4 | Content of cancerogenic polyaromatic hydrocarbons (nt/test) | 60–18540 | 17–5940 |
| | including benz(a)pyrene | 283.5 | 93.0 |
| 1.5 | Filterability coefficient | 2.0 | 1.6 |
| | Indexes of waste gas toxity | | |
| 2.1 | Content of carbon oxide (ppm) at toxity testing in accordance with UN ECE rules No 24 at various speed and loading modes | 200–1200 | 200–1000 |
| | at speed testing (in full power mode at various rotational speed) | 450–1100 | 400–800 |
| 2.2 | Content of cancerogenic polyaromatic hydrocarbons (total) at toxity testing in accordance with UN ECE rules No 24 (at various speed and loading modes) (ng/test) | 44612.3–46089.5 | 15324.9–14572.5 |
| | including benz(a)pyrene | 283.5–275.9 | 93.9–99.0 |
| | Indexes of fuel economy | | |
| 3.1 | Specific fuel consumption (g/e hph) at toxity testing in accordance with UN ECE rules No 24 (at various speed and loading modes) | 155–420 | 151–400 |
| | at speed testing (in full power mode at various rotational speed) | 155–165 | 150–160 |

*fuel grade ДЭК-Л-0,1-62 manufactured by MNPZ in accordance with Specification 38.401-58-107-96
**fuel with addition of 0.05% depressive additive Keroflux 5486

The invention claimed is:

1. A method of complex treatment of diesel fuel, comprising the steps of heating diesel fuel; homogenization and separation in a centrifugal force field in a rotor-disk vortex apparatus; fine filtration at a filtering porous partition of hydrophobic material, said heating of diesel fuel including carrying out the heating during a process of circulation in a closed circuit including a heat exchanger and the rotor-disk vortex apparatus of an open type additional filtration carried out by a multilayer filter-reactor comprising granules of multifunctional catalyst, alkylating aromatic compounds, and a layer of transitional metals or transitional metal oxides.

2. A method as defined in claim 1; and further comprising carrying out the additional filtration at temperature of fuel being treated 25–45° C. and a pressure differential at a filter-reactor up to 0.2 MPa.

* * * * *